March 9, 1971 — J. SCHAAD — 3,568,431
ELECTRIC TIME PIECE WITH BALANCE WHEEL AND HAIRSPRING
Filed July 7, 1969
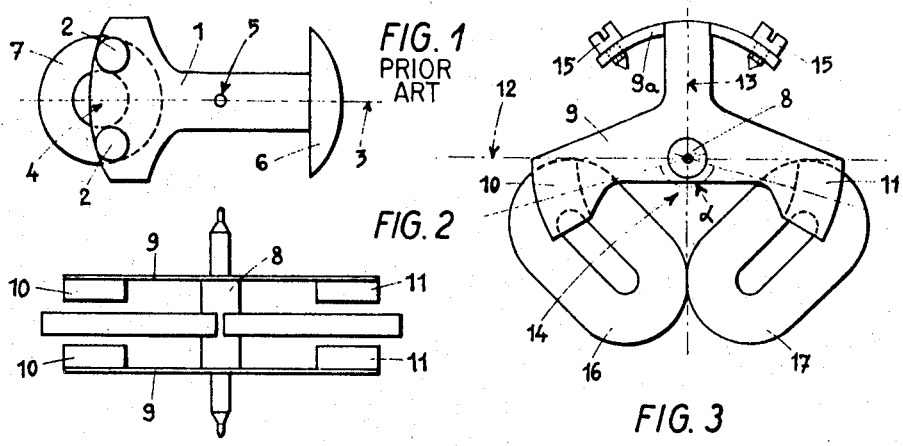
FIG. 1 PRIOR ART
FIG. 2
FIG. 3
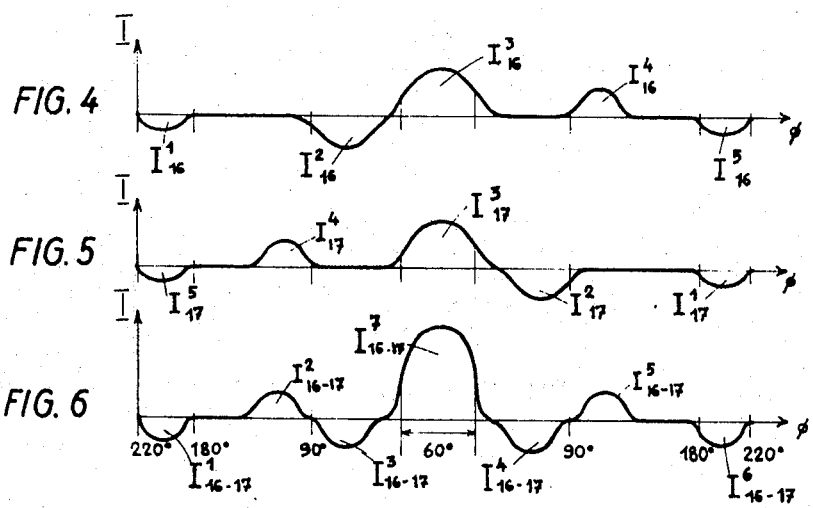
FIG. 4
FIG. 5
FIG. 6
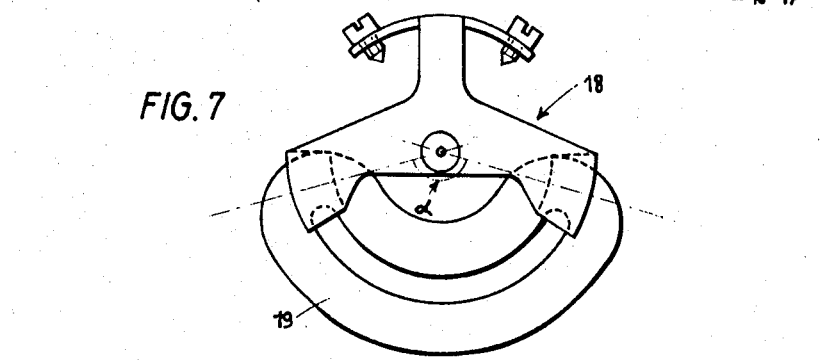
FIG. 7
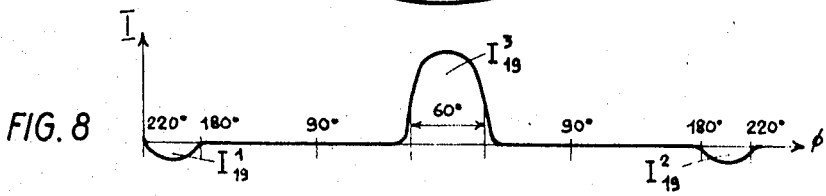
FIG. 8
INVENTOR.
Jean SCHAAD
BY Kenwood Ross &
Chester E. Flavin
ATTORNEYS.

United States Patent Office 3,568,431
Patented Mar. 9, 1971

3,568,431
ELECTRIC TIME PIECE WITH BALANCE WHEEL AND HAIRSPRING
Jean Schaad, Gorgier, Neuchatel, Switzerland, assignor to Voumard Machines Co. S.A., La Chaux-de-Fonds, Neuchatel, Switzerland
Filed July 7, 1969, Ser. No. 839,534
Int. Cl. G04c 3/04
U.S. Cl. 58—28                                    1 Claim

ABSTRACT OF THE DISCLOSURE

The present invention has for its object an electric timepiece with a balance wheel and hairspring, in which the balance wheel carries at least two magnets acting on at least one pick-up winding for inducing therein a driving current.

In timepieces of the above mentioned type, the magnets of the balance wheel are generally situated in the immediate neighborhood of a diametral plane thereof, on both sides of this plane. Their center of gravity is situated in this plane at a great distance from the center of the balance wheel.

Such a construction necessitates a relatively heavy counterweight able to counterbalance the disequilibrium produced by the magnets which leads to a balance wheel with a too large moment of inertia. The result is that the magnets must necessarily be of small dimension, or their weight, added to that of the counterweight, would lead to a balance wheel with a too large moment of inertia.

This limitation in the weight of the magnets of the balance wheel evokes a limitation in their section, so that if they move themselves during oscillations of the balance wheel, facing a pick-up winding, they can only induce in this winding a driving pulse of very short duration.

The purpose of this invention is to permit obtaining an increase of the section of the magnets carried by the balance wheel, so that these magnets induce a pulse of longer duration in the pick-up winding or windings, while utilising the same magnetic materials.

The timepiece according to the invention is characterised by the fact that the magnets of the balance wheel are situated in the immediate neighborhood of a diametral plane thereof, on the same side of this plane, symmetrically with respect to a second diametral plane, perpendicular to the first one, so as to counterbalance one another to a large extent, the surface of these magnets, viewed in plan, being such that the driving pulse they provoke is produced upon an oscillation of the balance wheel of an amplitude of at least 50°.

The drawing shows, by way of example, one embodiment of the object of the invention and a modification.

FIG. 1 is a plan view of a known balance wheel, as described hereabove.

FIG. 2 is an elevational plan view of a part of an electrical timepiece.

FIG. 3 is a plan view thereof.

FIGS. 4 and 5 represent diagrams of the current induced in each of the two pick-up windings as a function of the angular position of the balance wheel.

FIG. 6 is a diagram representing the sum of the currents induced.

FIG. 7 is a plan view of a detail of a modification, and

FIG. 8 is a diagram of the current induced in the pick-up winding as a function of the angular position of the balance wheel.

The balance wheel represented in FIG. 1 corresponds to the known balance wheels as described hereabove: It comprises two parallel plates one of which, designated by 1, is shown on the drawing, each carrying two magnets 2 situated on both sides of a diametral plane 3, in the immediate neighbourhood of this plane, in such a manner so that their center of gravity is situated in this plane, at a point 4 situated at a relatively great distance from the center 5 of oscillation of the balance wheel. The result is that the weight of the two magnets 2 must be compensated by a counterweight 6, diametrally opposite the magnets, the center of gravity of which is situated in the plane 3, this counterweight having a weight substantially equivalent to the sum of that of the two magnets.

In order to prevent the moment of inertia of the balance from being too high, the magnets 2 must be small, so that their cross-section is small too; consequently, they only induce in the pick-up winding, designated by 7, currents of very brief duration producing driving pulses of the balance wheel likely of very short duration.

The timepiece partially represented in FIG. 2 and 3 comprises a balance wheel the shaft of which carries two plates 9 each carrying two magnets 10 and 11 situated in the immediate neighborhood of a diametral plane 12 of the balance wheel, on the same side of this plane. These two magnets are located symmetrically with respect to a second diametral plane, designated by 13, perpendicular to the first one. Consequently, the center of gravity of the two magnets 10 and 11 of each plate 9 is located at a point 14 situated in the plane 13, in the immediate neighborhood of the axis of rotation of the balance wheel.

Therefore, the magnets only produce a slight disequilibrium of the balance wheel which can be compensated by a light counterweight formed by two screws 15 carried by a folded part 9a of each plate 9, situated on both sides of the plane 13, symmetrically with respect thereto.

Thus the weight of the magnets, and consequently their cross-section, shown in FIG. 3, can be greatly increased with respect to the weight and to the section of the magnets of the conventional constructions, such as the magnets of the example represented in FIG. 1.

Consequently the duration of passage of the magnets with respect to the pick-up winding increases, and the duration of the pulses induced in this winding also increases.

In the example shown, the timepiece comprises two flat ring shaped pick-up windings 16 and 17, juxtaposed, connected in series, situated in the air-gap formed by the two magnets 10 on the one hand and by the two magnets 11 on the other hand.

These two windings both occupy, in plan view (FIG. 3), an area having the general form of segments of a crown, extending on an arc coinciding with the angular distance, measured at the center, separating the two magnets of each plate, indicated by angle $\alpha$ on FIG. 3. The relative position between these windings and the balance wheel is such that, when the latter occupies its equilibrium position, shown on the drawing, the two extremities of the area occupied by the windings are situated in the air-gap of the two pairs of magnets.

During oscillations of the balance wheel, current is induced in each winding in the manner illustrated in FIGS. 4 and 5 respective:

Starting from one of the extreme positions of the balance wheel, situated at 220° with respect to the equilibrium position, one of the pairs of magnets being thus situated facing one portion of the considered winding, this pair passes this portion of winding at a relatively low speed, thus inducing a relatively weak current $I^1{}_{16}$, in this winding. When the balance wheel is just under 90° with respect to its equilibrium position, the other pair of magnets passes the portion of the winding and induces therein a current $I^2{}_{16}$ of greater voltage, the speed of the balance having increased. When the balance wheel passes its equilibrium position, the second pair of magnets induces in the winding a current $I^3{}_{16}$ the voltage of which is greater since the speed of the balance wheel is then maximum. At just over 90° from the equilibrium position of the balance wheel, the first pair of magnets induces a current $I^4_{16}$ of substantially the same voltage as $I^2_{16}$. Finally, in the neighbourhood of the opposite extreme position, the first pair of magnets once again induces in the winding a current $I^5_{16}$, of low voltage due to the slow speed of the magnet.

The same is true for winding 17 where the different currents are represented by $I^1_{17}$, $I^2_{17}$, $I^3_{17}$, $I^4_{17}$ and $I^5_{17}$.

Observing the voltages and the signs of these different currents, such as they appear in FIGS. 4 and 5, it appears that at each semi-oscillation of the balance wheel, six relatively weak pulses are produced of which four are of one sign and two of opposite sign, situated in pairs symmetrically with respect to the equilibrium position of the balance wheel, designated by $I^1_{16-17}$, $I^2_{16-17}$, $I^3_{16-17}$, $I^4_{16-17}$, $I^5_{16-17}$ and $I^6_{16-17}$.

An induced current $I^7_{16-17}$ of higher voltage is additionally produced, the voltage of which has a value $I^3_{16}+I^3_{17}$, extending over an amplitude of 60° and centered on the equilibrium position of the balance wheel.

The electronic circuit transforming the induced currents in the pick-up winding into driving pulses applied to the driving winding is not represented, this circuit being known per se. It comprises at least one transistor on the base of which is connected the pick-up winding, which alternately opens and closes the driving circuit of the balance wheel which comprises a source of current connected to the driving winding. It is sufficient to arrange this circuit in such a manner that only the pulses of solely one sign are utilised to eliminate pulses $I^1_{16-17}$, $I^3_{16-17}$, $I^4_{16-17}$ and $I^6_{16-17}$. Furthermore, while realising a working threshold, and while fixing this threshold to a value superior to that of $I^2_{16-17}$, and $I^5_{16-17}$, these pulses are also eliminated and it is provided that only pulse $I^7_{16-17}$ is utilised, so that each semi-oscillation of the balance wheel thus receives a driving pulse of substantial duration, centered on its passage to the equilibrium position. This particularity improves the efficiency when the balance wheel is motor, and additionally permits to control a synchronous motor balance wheel from a tree controlling balance wheel.

The improvement of the efficiency is due to the fact that, for a given driving power, the current in the driving winding decreases the longer be the duration of the pulses. Thus, if the driving current can be reduced, the ohmic loss decreases also.

In the case where the balance wheel is not motor but free, and serves to control a synchronous motor balance wheel, a too brief pulse of the synchronous winding gives pulses sometimes to the balance wheel, sometimes light, upon the slightest displacement. Sufficiently long pulses are therefore necessary so that the desired synchronisation of a second balance wheel is possible, without risk of an under-synchronisation on the secondary pulses $I^1_{16-17}$ and $I^5_{16-17}$ of FIG. 6.

Finally it is to be noted that the winding can be considerably increased, due to the present arrangement with respect to the windings of usual arrangements an example of which is represented in FIG. 1, which even improves the gain as far as the length of the pulses is concerned.

In the modification of FIG. 7, the balance wheel designated in a general manner by 18, is identical to the balance wheel of the first embodiment.

However, in this modification, the two pick-up windings 16 and 17 of the first embodiment have been replaced by a single flat ring shaped pick-up winding 19 having the general form of a segment of a crown extending on an arc coinciding substantially with the angular distance, measured at the center, separating the two magnets of each plate, indicated by $\alpha$.

The image of the current induced in the winding 19 by the magnets of the balance wheel 18, in the course of a semi-oscillation of the balance wheel, is given by the diagram of FIG. 8 where it can be seen that the two weak currents $I^1_{19}$ and $I^2_{19}$ are induced in the winding 19 at the two extreme positions of the balance wheel while a larger current $I^3_{19}$, of opposite sign, is induced during the passage of the balance wheel at its equilibrium position over an amplitude of oscillation of approximately 60°.

I claim:

1. In an electric timepiece with a balance wheel and hairspring in which the balance wheel carries at least two magnets acting on at least one pick-up winding for inducing therein a driving current therein, the improvement comprising: counterbalancing the magnets by locating same in the immediate neighborhood of a diametral plane of the balance wheel and on the same side of the plane and symmetrically with respect to a second diametral plane perpendicular to the first plane, the cross section of the magnets being such that the driving pulse is produced upon an oscillation of the balance wheel of an amplitude of at least 50°, and including a pair of opposite plates, each of the plates carrying a pair of magnets, the winding being disposed in the air-gap between the pairs of magnets formed by each magnet of one of the plates with the corresponding magnet of the other, the winding comprising two juxtaposed flat ring-shaped pick-up windings fixed in series in front of each one of which each pair of magnets successively moves itself during oscillation of the balance wheel, the windings occupying an area having the form of a segment of a crown extending over an arc coinciding substantially with the angular distance separating the two magnets of each plate, the relative position between the windings and the balance wheel being such that, when the balance wheel occupies its equilibrium position, the two extremities of the area occupied by the windings are situated in the air-gap of the two pairs of magnets.

References Cited

UNITED STATES PATENTS 3,487,629   1/1970   Takamune et al. _____ 58—28

RICHARD B. WILKINSON, Primary Examiner

E. C. SIMMONS, Assistant Examiner

U.S. Cl. X.R.

58—107